United States Patent [19]
Ruohola et al.

[11] 3,747,542
[45] July 24, 1973

[54] METHOD AND DEVICE FOR THE TREATMENT OF REFUSE

[75] Inventors: Tuomo Ruohola; Pauli Unto Juhani Nyberg; Ero Oskari Joutsen; Kullervo Ennelin, all of Tempere, Finland

[73] Assignee: Oy Tampella AB, Tampere, Finland

[22] Filed: Mar. 17, 1971

[21] Appl. No.: 125,315

[30] Foreign Application Priority Data
Mar. 18, 1970  Finland..........................752/70

[52] U.S. Cl. ................................ 110/8 R, 110/8 A
[51] Int. Cl. ............................................ F23g 5/00
[58] Field of Search .................. 110/8 R, 8 E, 18 R, 110/18 E, 8 A

[56] References Cited
UNITED STATES PATENTS
3,616,768  11/1971  Southwick ........................... 110/18
2,932,712  4/1960   Levin ..................................... 110/8
3,344,758  10/1967  Wotschke ............................. 110/18
3,417,717  12/1968  Jacobovici ........................... 110/18
3,592,151  7/1971   Webber ................................. 110/8
3,527,178  9/1970   Southwick ............................ 110/8

Primary Examiner—Kenneth W. Sprague
Attorney—Hall, Pollock & Vande Sande

[57] ABSTRACT

Method and apparatus for the treatment of refuse. The refuse is heated to a sufficiently high temperature to cause the refuse, even metal included therein, to melt. A molten bath is maintained in such a manner that the combustion products are caused to impinge upon the molten bath so that ash, soot, and other particles become entrained in the bath. The heat resulting from the combustion is used to maintain the bath in a molten state.

14 Claims, 1 Drawing Figure

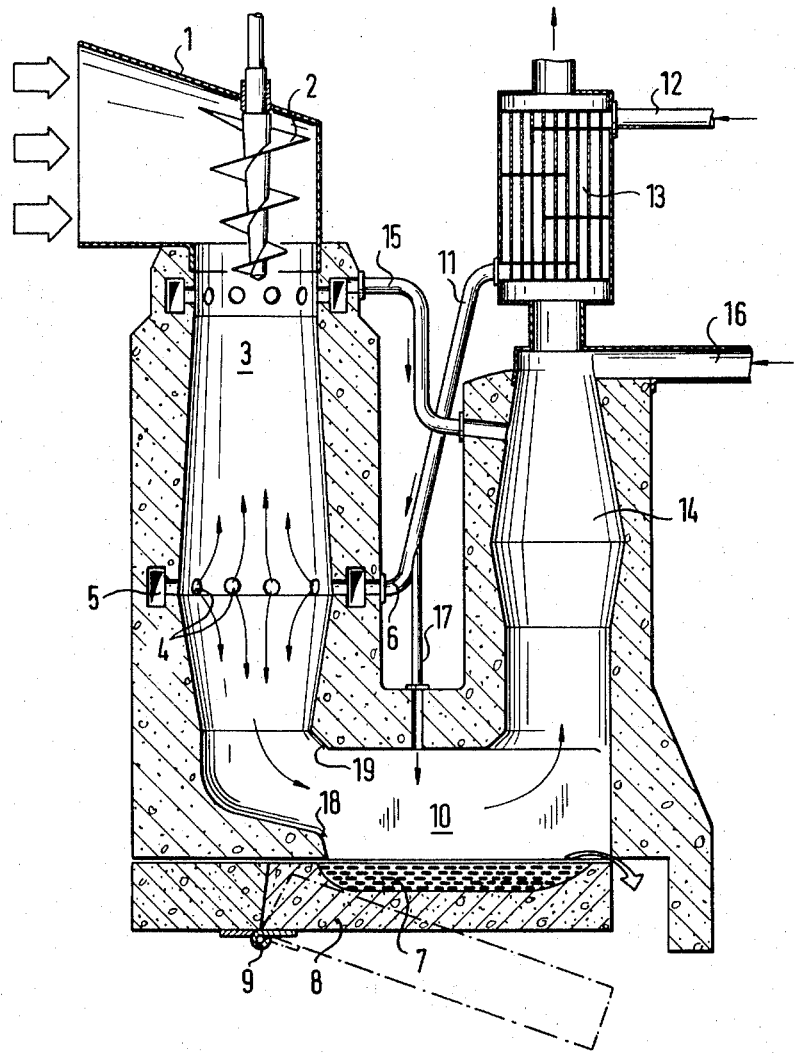

METHOD AND DEVICE FOR THE TREATMENT OF REFUSE

The present invention relates to a method for the treatment of refuse by combustion.

The proper disposal of ashes of burnt refuse causes problems which are almost as severe as those resulting from the dumping of refuse on dumping grounds. In fact, the dissolving of materials from ashes into the ground water may constitute an even more serious problem. Another drawback of the combustion of refuse is that non-combustible or poorly burning refuse is treatable in this way.

To remove these drawbacks it has been suggested that the temperature of the burning refuse so that the non-combustible wastes, e.g., of metal, as well as ashes, will melt. Various drawbacks have, however, appeared in the devices constructed in accordance with this principle as pointed out, for example, in the publication Brennstoff-Warme-Kraft 20 (1968), no. 5. This publication also contains a description of an improved device wherein at a certain point, the temperature is raised to a value as high as 1,400° – 1,700° C. The slag, which becomes liquid at this temperature, is delivered to a water bath where very finely divided, sterile granulate is formed. This can be made use as a soil filling without risk of contamination of the ground water.

The present invention comprises an improvement over the prior art described above, and the purpose of the invention is to provide a method and equipment wherein refuse is treated by combustion and the temperature thereof is elevated to a level where the refuse and/or its combustion products will melt. A special and new characteristic of the method in accordance with the invention is that the melts will become joined with each other and are maintained as a molten bath by the introduction of heat. Various considerable advantages are obtained hereby in comparison with the prior art described above.

An important advantage obtained by the method in accordance with the invention consists of the fact that in the molten bath even those wastes which create the most difficulty are destroyed and even those materials which are not readily melted are heated sufficiently to melt completely. This is particularly important in grateless refuse burning furnaces, in which the article is dropped from above and only a short time is provided for proper burning. Furthermore, there are many different kinds of waste materials and it is therefore difficult to maintain conditions in the burning zone that are suitable for all different wastes. With the method in accordance with the invention, this is not necessary as the waste which passes through the burning zone even at high speed enters the molten bath and will there be subjected to so high a temperature that it will be melted and incorporated in the molten bath.

From time to time an appropriate quantity of melt is removed from the bath, and this melt is allowed to cool. In this way, large solid pieces are formed, the removal of which is much easier than the removal of refuse in the form of small grains or flakes. Such pieces, cast into big lumps, can be used for numerous purposes in addition to its use as soil filling when it is in the form of loose grains. One can even say that by the method in accordance with the invention, as a result of the destroying of waste materials, so valuable a product is obtained that the apparatus in accordance with the invention can as well be regarded as an apparatus for making this product than as an apparatus for the destroying of wastes. In respect to the apparatus, this is of great importance as it will be economically profitable to provide the apparatus with control and regulating devices for automatic operation.

Other advantages, specialities and details of the invention are described in the following with reference to the enclosed DRAWING which schematically shows a vertical section of the device for the handling of refuse in accordance with an embodiment of the invention.

On the left in the DRAWING is shown a chute 1, into which the refuse is introduced as indicated by arrows. The refuse is moved through the chute by any means such as a screw 2. By altering the rotational velocity of the rate of screw, the feeding can be regulated. Combustion air is delivered into the furnace 3 from wall openings 4 which are connected with the annular ring 5 which communicates with the conduit 6.

In the method according to the invention, it is possible to carry out the process entirely without supplying extra fuel. This is possible above all because the combustion air which is delivered to the furnace 3 is first preheated to about 500 – 700° C. Preliminary experiments have indicated that while the effective heat value of town garbage is today about 1,800 – 3,000 calories/kg, by preheating the combustion air to said temperature in accordance with the invention, a burning temperature of approx. 1,400° C is easily obtained in the furnace 3. This temperature is sufficient to melt almost all materials appearing in the refuse, with the result that the ash will be similar to molten lava.

In the method according to the invention, the melts are incorporated in a molten bath 7 wherein a trough-like lower member 8. By arranging this lower member 8 to be rotatable about a hinge 9, as indicated by the broken lines, a desired quantity of the melt can be removed from time to time in the manner indicated by the arrow. It is therefore possible, on the one hand, to maintain an appropriate amount of melt in the trough and, on the other hand, to produce from this melt, by casting, a substance that will cool into large pieces in accordance with the mold which may be used for casting.

The pieces cast from the melt can be bar-like, plate-like or have any shape whatsoever, depending on the purpose. The cooled pieces are solid and firm in structure, they can be easily worked on and they have, of course, a good resistance to heat. Different building pieces can be made from them, as slabs for walls, roofs and floors, building bricks, slabs for hallways, flue pieces, steps, gravestones and statues, road coverings, partition elements etc.

Instead of tipping the trough-like lower part 8 from time to time, the melt 7 can of course be tapped periodically or continuously be a conduit or a channel.

As appears from the drawing, the melt 7 is exposed to the radiation of the combustion taking place in the furnace 3 and remains therefore very hot. This improves the combustion in the space 10 situated above the melt 7, into which the preheated combustion air is furthermore delivered by the conduit 17. A special purpose is to burn the carbon monoxide, appearing at this point, into carbon dioxide. The conduits 6 and 7 are branched off from a common conduit 11 which receives air from the feed conduit 12, with the air being heated by the heat exchanger 13. Combustion air is delivered into the conduit 12 by a blower (not shown). The heating of the combustion air takes place in the heat exchanger by flue-gases. The flue gases from chamber 10 into an after combustion chamber 14, which also receives combustion gases via the conduit 15 from the furnace 3.

It appears from the foregoing that the method in accordance with the invention is very uncomplicated and the equipment needed for carrying out the method is inexpensive. The equipment consists of the following parts: feeding apparatus, furnace, molten bath, after-combustion furnace, heat exchanger and a channel system. The feeding apparatus 1, 2 presses and doses the wastes into the furnace chute 3.

The proper combustion takes place by means of preheated air in the middle part of the furnace 3 or somewhat lower, at the openings 4. Toward the lower part of the furnace 3 an elbow-like directing configuration is provided whose purpose is to direct onto the surface of the melt 7 the ash, soot and other particles contained in the combustion gases. A step 18 can be provided which holds back or retards such refuse pieces which should still be burnt before arriving in the bath 7. The location of the step 18 is preferably such that it is situated on both sides of the imaginary vertical line passing through the middle of the angle portion 19.

The most essential part of the equipment is the trough part 8 with the molten bath 7. The removal of the melt also takes place here, by tipping or by emptying in a suitable manner. The admission of combustion air from the conduit 17 causes the combustible gas parts, remaining in the flue-gases, such as for example carbon monoxide, to be burnt. In the after-combustion chamber 14 gases are burnt tangentially by means of the additional air admitted by the conduit 16 and by means of the damp flue-gases admitted through the conduit 15. Such after-combustion chamber can also be provided with heat recovery, whereby the temperature of the combustion gases is decreased so much that the preheating of the combustion air can be easily carried out. The preheating device 13 of the combustion air is situated immediately behind the after-combustion chamber 14. The after-treatment of gases, heat recovery, cooling, purification etc. is carried out on the basis of ordinary technique. Thus, the gases must, for example, in many cases be washed due to the evaporated salts. Of essential importance in the equipment in accordance with the invention is furthermore the channel system 4,5,6,17,11,12,15 and 16, the importance of which has already been described above.

We claim:

1. A method for the combustion of refuse comprising the steps of:
   burning the refuse in the presence of heated air as it falls freely under the influence of gravity through a combustion chamber at a temperature sufficiently high to reduce to a molten state the metal and glass constituents which may be present in the refuse,
   maintaining a molten pool of the metal and glass constituents of the refuse,
   collecting at the bottom of the combustion chamber at a location remote from the molten pool any unburned portions of the refuse,
   conveying the combustion products of the burning step and also any unburned portions of the refuse to the surface of a molten pool so as to incorporate within said pool the ash and soot resulting from the burning step and as well the unburned portions of refuse, and
   maintaining said pool in a molten state by the combustion gases which flow above the molten pool.

2. The method of claim 1 in which the sole source of heat for the method is provided by the burning of the refuse.

3. The method of claim 1 wherein additional air is introduced over the molten bath.

4. The method of claim 3 wherein both the additional air introduced over the molten bath and also the heated air introduced in the burning step are heated by the combustion gases which in turn are heated by the molten bath.

5. The method of claim 1 wherein the combustion products are conveyed laterally across the surface of the molten pool.

6. The method of claim 1 wherein during the burning step the temperature within the furnace is maintained at about a minimum of 1,400° C.

7. Apparatus for the burning of refuse comprising in combination,
   a vertical combustion chamber having means for the introduction of refuse into a top portion thereof and constructed to permit the refuse to fall freely vertically therethrough,
   means for containing a molten pool of refuse and of the combustion byproducts from said combustion chamber,
   said containing means being laterally offset from said combustion chamber and communicating with the bottom of said combustion chamber via means including a sill portion disposed below the bottom of said combustion chamber, and extending substantially across the bottom of said combustion chamber, said sill portion providing a surface onto which can fall any refuse not fully burnt in said combustion chamber and being effective to slow the passage of both unburned refuse and the combustion byproducts of the refuse burned in said combustion chamber prior to passing into and over the surface of said molten pool.

8. The apparatus of claim 7 which further includes means for conducting the gases resulting from the burning in said chamber in a substantially horizontal direction across said molten bath, and means at least partially surrounding said molten bath to reduce radiation heat losses therefrom.

9. The apparatus of claim 8 wherein said communicating means controls the flow of gases and combustion byproducts so as to impinge upon the surface of said molten bath.

10. The apparatus of claim 7 wherein said containing means comprises a trough-like member.

11. The apparatus of claim 10 wherein said trough-like member is hinged about a horizontal axis to at times permit the dumping of said molten bath from said trough.

12. The apparatus of claim 7 which includes an after-combustion chamber through which are conveyed the gases which have been heated by said molten bath, heat exchanger means for heating air by the heat contained in the gases passing through said after-combustion chamber, and means for conveying at least part of the heated air to the space above said molten bath.

13. The apparatus of claim 7 which includes an after-combustion chamber the lower portion of which is in communication with the surface of the molten bath, means for introducing air tangentially into the upper portion of said after-combustion chamber, and means for conducting flue gases from the upper part of the burning chamber to said after-combustion chamber.

14. The apparatus of claim 7 which includes an after-combustion chamber through which are conveyed the gases which have been heated by said molten bath, heat exchanger means connected with the upper end of said after-combustion chamber for heating combustion air, and means for conveying the heated combustion air both to said burning chamber and to said molten bath.

* * * * *

PO-1050
(5/69)

UNITED STATES PATENT OFFICE
CERTIFICATE OF CORRECTION

Patent No. 3,747,542      Dated July 24, 1973

Inventor(s) TUOMO RUOHOLA, PAULI UNTO JUHANI NYBERG, EERO OSKARI JOUTSEN and KULLERVO ENNELIN It is certified that error appears in the above-identified patent and that said Letters Patent are hereby corrected as shown below:

On the Title Page, Section [75] Inventors: The name of the third inventor should be Eero Oskari Jouts‹

Signed and sealed this 25th day of December 1973.

(SEAL)
Attest:

EDWARD M. FLETCHER, JR.
Attesting Officer

RENE D. TEGTMEYER
Acting Commissioner of Patents